United States Patent
Shaw et al.

(10) Patent No.: US 10,344,725 B2
(45) Date of Patent: Jul. 9, 2019

(54) FLUID INJECTOR SPRAY DISC HAVING OFFSET CHANNEL ARCHITECTURE, AND METHODS FOR CONSTRUCTING AND UTILIZING SAME

(71) Applicant: Continental Automotive Systems, Inc., Auburn Hills, MI (US)

(72) Inventors: Keith Aaron Shaw, Yorktown, VA (US); Robert Wayne McFarland, Smithfield, VA (US); Joshua Lee Hatfield, Newport News, VA (US)

(73) Assignee: Continental Powertrain, USA, LLC., Auburn Hills, MI (US)

( * ) Notice: Subject to any disclaimer, the term of this patent is extended or adjusted under 35 U.S.C. 154(b) by 0 days.

(21) Appl. No.: 15/622,759

(22) Filed: Jun. 14, 2017

(65) Prior Publication Data

US 2018/0363611 A1    Dec. 20, 2018

(51) Int. Cl.
| | | |
|---|---|---|
| *F02M 61/18* | (2006.01) | |
| *F02M 61/16* | (2006.01) | |
| *F02B 31/04* | (2006.01) | |

(52) U.S. Cl.
CPC ........... *F02M 61/163* (2013.01); *F02B 31/04* (2013.01); *F02M 61/162* (2013.01); *F02M 61/1806* (2013.01); *F02M 61/1853* (2013.01)

(58) Field of Classification Search
CPC ............. F02M 61/162; F02M 61/1853; F02M 61/1813; F02B 31/04; F02B 2023/108
USPC ....... 123/298, 301; 239/533.12, 533.14, 545, 239/540
See application file for complete search history.

(56) References Cited

U.S. PATENT DOCUMENTS

| | | | | |
|---|---|---|---|---|
| 6,764,033 B2* | 7/2004 | Dantes et al. | ....... | F02M 61/162 239/494 |
| 7,137,577 B2* | 11/2006 | Goenka | .............. | F02M 61/1806 239/533.12 |
| 8,567,701 B2* | 10/2013 | Hashii | ................ | F02M 51/0682 239/490 |
| 9,587,608 B2* | 3/2017 | Jeannel | ................. | B05B 1/3436 |

(Continued)

FOREIGN PATENT DOCUMENTS

| | | |
|---|---|---|
| EP | 1201917 A2 | 5/2002 |
| EP | 3199796 A1 | 8/2017 |

(Continued)

OTHER PUBLICATIONS

International Search Report and the Written Opinion of the International Searching Autority dated Sep. 18, 2018 for corresponding PCT Application No. PCT/US2018/037311.

*Primary Examiner* — Hai H Huynh

(57) ABSTRACT

A fluid injector for injecting fluid includes a body with a fluid passageway extending from an inlet to an outlet of the fluid injector; a valve seat; a valve element that is selectively engages with the valve seat; and a disc member disposed in the fluid passageway downstream of the valve seat. The disc member includes a plurality of channels defined along a first surface of the disc member, and a plurality of orifices defined through the disc, with each disc member being fluidly coupled to a plurality of channels. The channels fluidly coupled to each channel are in offset relation to each other at the orifice such that fluid flowing through the orifice forms a swirl pattern when exiting the orifice.

13 Claims, 6 Drawing Sheets

(56) References Cited

U.S. PATENT DOCUMENTS

| | | | |
|---|---|---|---|
| 2002/0008166 A1* | 1/2002 | Fukaya | F02M 61/168 239/533.12 |
| 2003/0234005 A1* | 12/2003 | Sumisha | F02M 51/0678 123/467 |
| 2004/0011895 A1* | 1/2004 | Dantes et al. | F02M 51/0671 239/585.1 |
| 2004/0060538 A1* | 4/2004 | Togashi | F02M 51/0671 123/294 |
| 2004/0104285 A1* | 6/2004 | Okamoto | F02M 51/0671 239/533.12 |
| 2004/0217204 A1 | 11/2004 | Sugimoto et al. | |
| 2005/0087626 A1 | 4/2005 | Sayar | |
| 2005/0087627 A1 | 4/2005 | Sayar | |
| 2005/0087628 A1 | 4/2005 | Sayar | |
| 2005/0087629 A1 | 4/2005 | Sayer | |
| 2005/0087630 A1 | 4/2005 | Sayer | |
| 2005/0121543 A1 | 6/2005 | Sayar | |
| 2006/0097081 A1* | 5/2006 | Goenka | F02M 61/1806 239/533.12 |
| 2012/0223164 A1* | 9/2012 | Shi | F02M 61/16 239/584 |
| 2013/0255640 A1 | 10/2013 | Okamoto et al. | |
| 2014/0252132 A1 | 9/2014 | Jannel et al. | |

FOREIGN PATENT DOCUMENTS

| | | |
|---|---|---|
| JP | 2016211389 A | 12/2016 |
| WO | 9611335 | 4/1996 |
| WO | 2014183905 A1 | 11/2014 |

* cited by examiner

FLUID INJECTOR SPRAY DISC HAVING OFFSET CHANNEL ARCHITECTURE, AND METHODS FOR CONSTRUCTING AND UTILIZING SAME

FIELD OF INVENTION

The present invention generally relates to a spray disc for controlling fluid spray patterns ejected from a fluid injector, and particularly to a spray disc for a fuel or reductant injector which provides improved swirl spray patterns therefrom.

BACKGROUND

Strict emission standards for internal combustion engines require the use of advanced fuel and reductant metering techniques that tightly control fluid doses. The fine atomization of fuel or reductant injected into the combustion chamber or exhaust stream, respectively, of the internal combustion engine not only improves emission quality of the engine's exhaust, but also improves fuel consumption, cold start capability, and overall engine performance. One way of injecting a fine spray into the engine's intake manifold, combustion chamber or exhaust stream is for the fluid to have a swirl flow pattern as the fluid exits the fluid injector.

SUMMARY

Example embodiments provide an improved fluid injector for injecting a spray of fluid, such as fuel or reductant, having one or more swirl spray patterns. According to an example embodiment, a fluid injector for injecting fluid includes a body; a fluid passageway defined through the body and extending from an inlet to an outlet of the fluid injector; a valve seat disposed internally of the body within the fluid passageway; and a valve element that is selectively reciprocated relative to the valve seat to close and open the fluid passageway by seating the valve element on and unseating the valve element from the valve seat, respectively. The fluid injector further includes a disc member disposed in the fluid passageway downstream of the valve seat relative to a direction of the flow of fluid through the fluid injector. The disc member includes a plurality of channels defined along a first surface of the disc member and a plurality of orifices, with each orifice defined through the disc member and fluidly coupled to at least two of the channels. The channels fluidly coupled to each orifice are in offset relation to each other at the orifice such that fluid flowing through and exiting the orifices from the channels form a swirl pattern.

In an example embodiment, the channels associated with each orifice are collectively defined at least in part by a first elongated side wall and a second elongated side wall, each of the first elongated side wall and the second elongated side wall includes a dimple at the orifice, the dimples being disposed across the orifice from each other.

Tangent lines along the first elongated side wall are discontinuous at the orifice and tangent lines along the second side channel wall are discontinuous at the orifice. Each of the first and second elongated side walls includes a dimple defined at or proximal to the orifice.

In an example embodiment, each orifice is disposed along the disc member radially outwardly from an opening of the fluid passageway at a downstream portion of the valve seat, and each channel includes a first end opposite the orifice. The first end of each channel is disposed along the disc member radially inwardly of the opening of the fluid passageway at the downstream portion of the valve seat.

The channels fluidly coupled to each orifice may be fluidly coupled together at a location other than at the orifice.

In an example embodiment, for each channel, a channel width at the orifice is greater than a channel width at other locations of the channel.

In another example embodiment, each orifice is disposed along the disc member radially outwardly from an opening of the fluid passageway at a downstream portion of the valve seat. Each channel fluidly coupled to an orifice includes a first end opposite the orifice. The first ends of the channels are fluidly coupled to each other and are disposed along the disc member radially inwardly of the opening of the fluid passageway at the downstream portion of the valve seat.

In yet another example embodiment, a fluid injecting device includes a disc member for passing fluid therethrough, including a plurality of channels defined along a first surface of the disc member, and a plurality of orifices defined through the disc member. Each orifice is in fluid communication with a plurality of channels, and the channels in fluid communication with each orifice are in offset relation to each other at the orifice such that fluid flowing through the orifice from the channels forms a swirl flow pattern.

This example embodiment may further include a body; a fluid passageway defined through the body and extending from an inlet to an outlet of the fluid injection device; a valve seat disposed internally of the body within the fluid passageway; and a valve needle that is axially movable within the body between a closed position in which the valve needle sealing engages with the valve seat so as to prevent fluid from flowing through the fluid passageway and exiting the fluid injection device, and an open position in which the valve needle is spaced from the valve seat so as allow fluid to flow through the fluid passageway and exit the fluid injection device. Each orifice may be disposed along the disc member radially outwardly of an opening of the valve seat at a downstream portion thereof. Each channel may include a first end opposite the orifice with which the channel is in fluid communication, and each first end may be disposed along the disc member radially inwardly to the opening of the valve seat at the downstream portion thereof. The channels associated with each orifice are collectively defined at least in part by a first elongated side wall and a second elongated side wall, each of the first elongated side wall and the second elongated side wall may include a dimple located at the orifice, and the dimple of the first elongated side wall is disposed across the orifice from the dimple of the second elongated side wall.

In such example embodiment, tangent lines along the first elongated side wall are discontinuous at the orifice and tangent lines along the second elongated side wall are discontinuous at the orifice. Each channel in fluid communication with an orifice may include a first end at the orifice and a second end, and the second ends are in fluid communication with each other.

BRIEF DESCRIPTION OF THE DRAWINGS

Aspects of the invention will be explained in detail below with reference to an exemplary embodiment in conjunction with the drawings, in which.

DETAILED DESCRIPTION

The following description of the preferred embodiment(s) is merely exemplary in nature and is in no way intended to limit the invention, its application, or uses.

Example embodiments are generally directed to a disc member disposed at the outlet end of a fluid injector which causes fluid discharged from the fluid injector to follow multiple swirl flow patterns.

Figure 1:
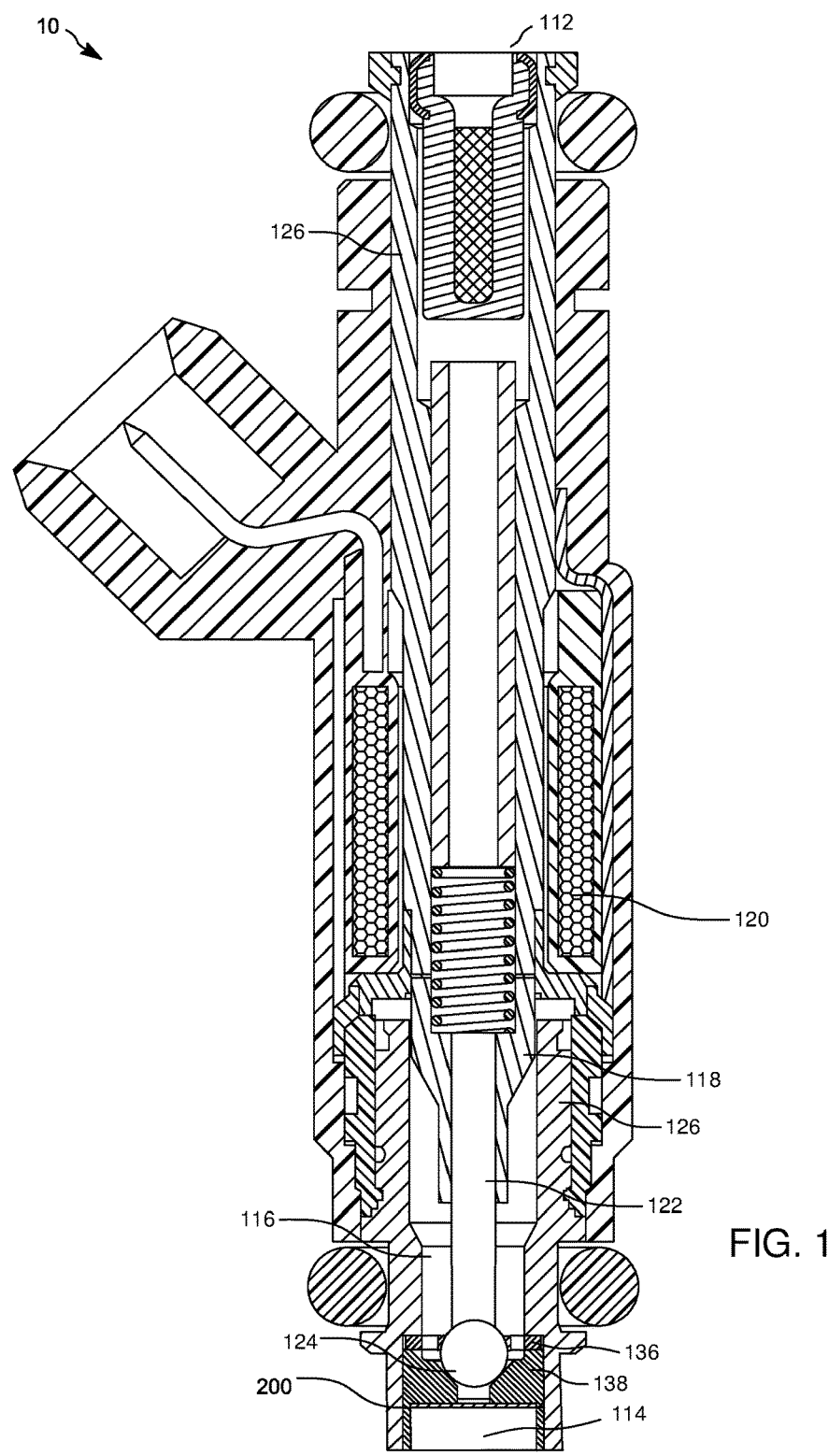
FIG. 1 is a cross-sectional side view of a fluid injector according to an example embodiment.
Figure 2:
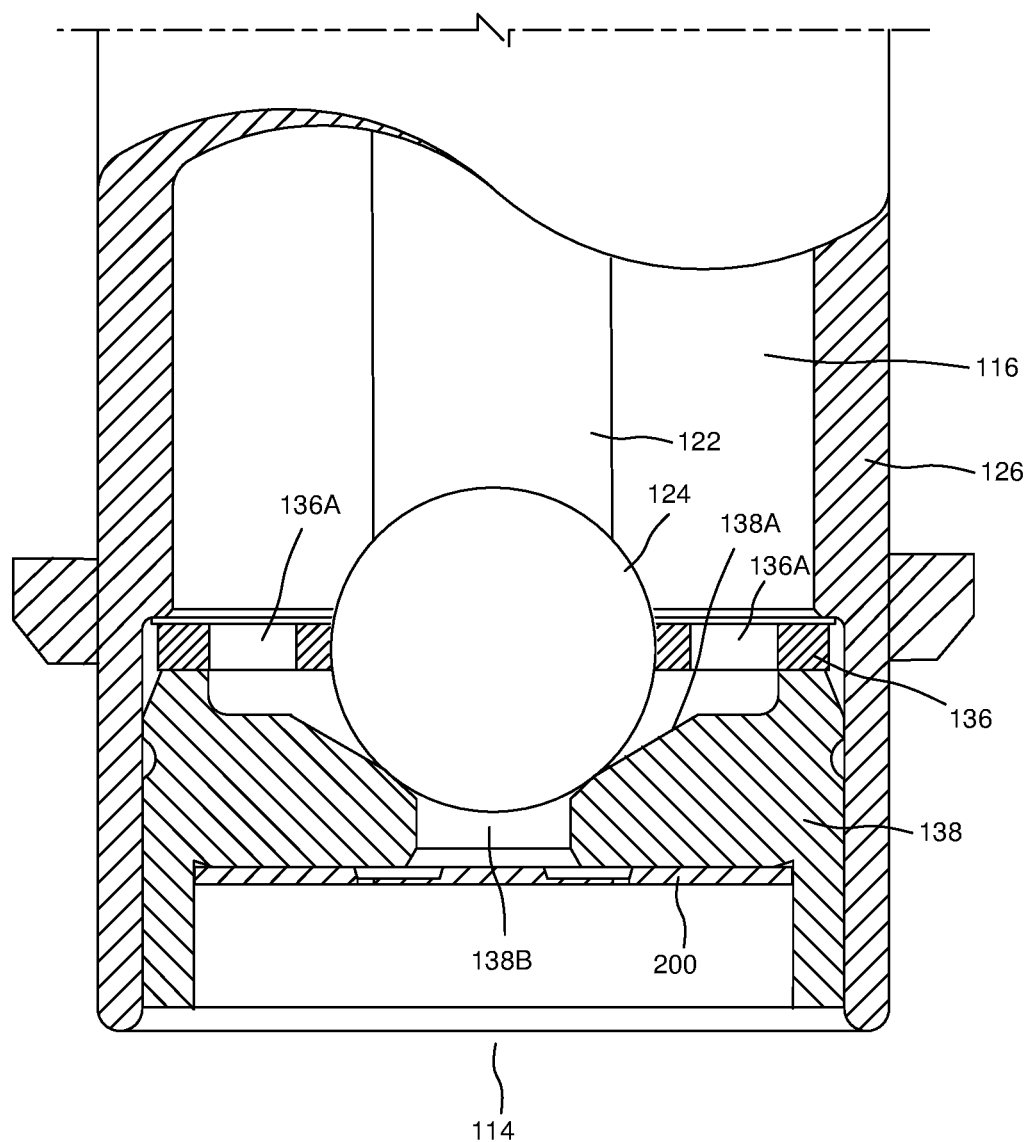
FIG. 2 is an enlarged cross-sectional view of an outlet portion of the fluid injector of FIG. 1 when the fluid injector is closed.
Figure 3:
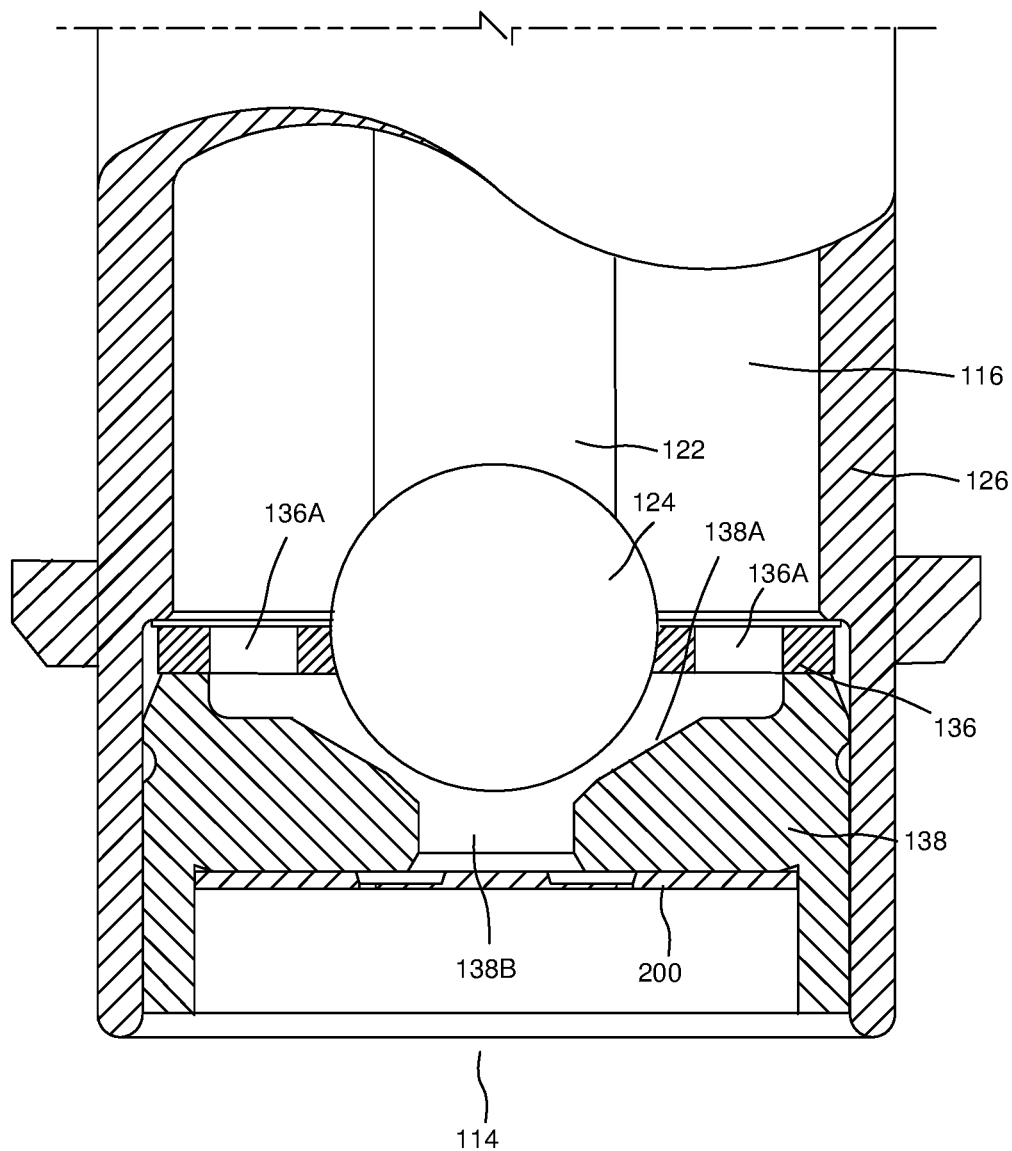
FIG. 3 is an enlarged cross-section view of the outlet portion of the fluid injector of FIG. 1 when the fluid injector is open.

FIGS. 1-3 illustrate a solenoid-operated fluid injector 10 according to an example embodiment. The fluid injector 10 has a fluid inlet 112, a fluid outlet 114, and a fluid passageway 116 extending from the fluid inlet 112 to the fluid outlet 114. Fluid injector 10 is of the conventional, solenoid-operated type, having an armature 118 operated by a coil 120. An electromagnetic force is generated by current flow from an electronic control unit (not shown) through the coil 120 in order to move armature 118. Movement of armature 118 also moves an operatively attached valve element and/or valve needle 122. Valve needle 122 includes a ball member 124 integrally formed with valve needle 122 at a downstream end thereof. Fluid injector 10 further includes a body 126 through which fluid passageway 116 is at least partly defined and in which valve needle 122 is at least partly disposed and movable therein. A valve seat 138 is fixedly disposed within body 126 and includes a bore defined therethrough. Valve needle 122 is axially movable within fluid injector 10 between a closed position in which ball member 124 of valve needle 122 sealing engages with valve seat 138 so that no fluid flows out of fluid outlet 114, and an open position in which ball member 124 is spaced from valve seat 138 so as to allow fluid to flow through fluid injector 10 and exit the injector at fluid outlet 114. Valve needle 122 and valve seat 138 form a valve assembly of fluid injector 10. Fluid injector 10 further includes spray disc member 200 which is coupled to a downstream side of valve seat 138. Fluid flowing through spray disc member 200 and exiting fluid injector 10 have swirl spray patterns, as discussed in greater detail below.

FIGS. 2 and 3 are simplified images of the downstream end portion of fluid injector 10 according to an example embodiment. The downstream end portion of fluid injector 10 includes a guide member 136 which, together with valve seat 138, are disposed axially interiorly of spray disc member 200. The guide member 136, valve seat 138 and spray disc member 200 are retained within body 126 by a suitable technique such as, for example, welding spray disc member 200 to valve seat 138 and welding seat 138 to body 126.

Valve seat 138 includes a frusto-conical shaped seating surface 138A that leads from guide member 136 to a central passage 138B of the seat 138 that, in turn, leads in a fluid flow direction to spray disc member 200. Guide member 136 includes a central guide opening for guiding the axial reciprocation of ball member 124 and several through-openings 136A distributed around the central opening to provide for fluid to flow into and through valve seat 138. FIG. 2 shows ball member 124 seated on sealing surface 138A, thus preventing fluid flow from fluid injector 10, and FIG. 3 shows ball member 124 displaced from sealing surface 138A, thereby opening fluid injector 10 and allowing the flow of fluid therefrom.

Figure 4:
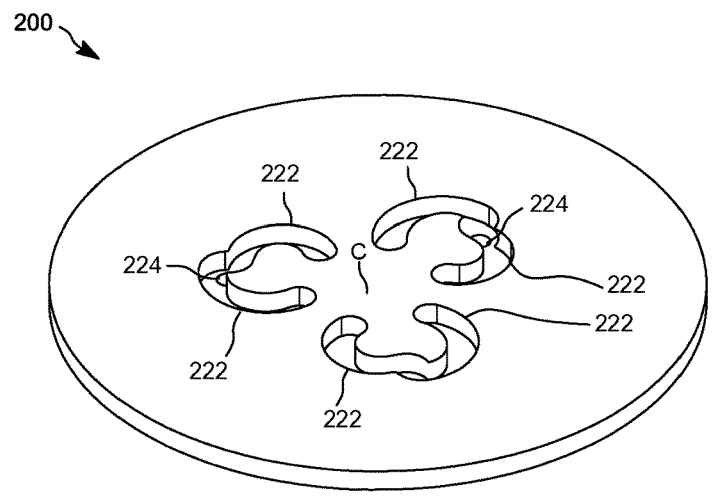
FIG. 4 is a perspective view of a disc member of FIG. 1 according to an example embodiment.
Figure 5:
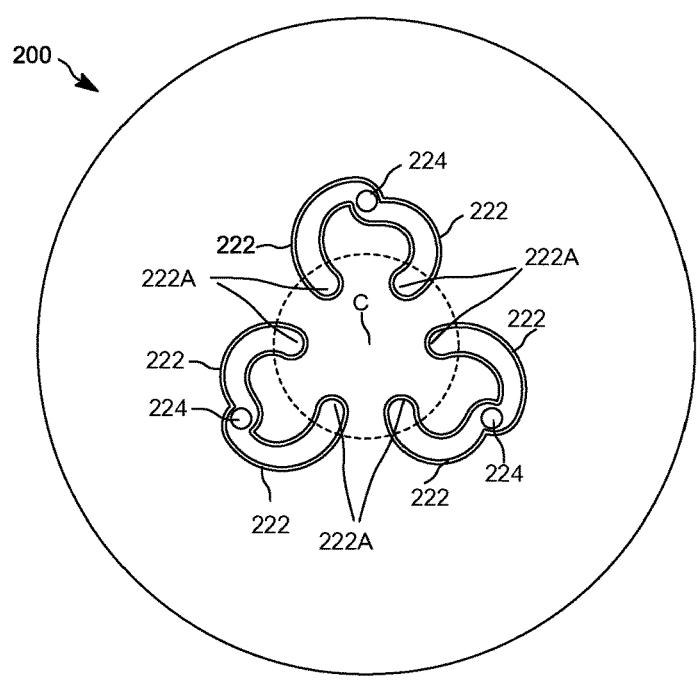
FIG. 5 is a top view of the disc member of the fluid injector of FIG. 1.

FIGS. 4 and 5 illustrate spray disc member 200 according to an example embodiment. Spray disc member 200 is constructed from a metal or a metal composition. As can be seen, spray disc member 200 is flat with opposed planar surfaces. It is understood, however, that spray disc member 200 may have different shapes, such as including a centrally disposed dimple which extends outwardly in a downstream direction, i.e., in a direction of fluid flow through fluid injector 10.

Disc member 200 includes a plurality of channels 222 defined along the upstream surface of disc member 200 and a plurality of orifices 224 defined through disc member 200. Orifices 224 are disposed within channels 222. In the illustrated example embodiment, disc member 200 includes six channels 222 that are symmetrically spaced about a center C of disc member 200 but it is understood that more or less than six channels 222 may be symmetrically disposed about the center of disc member 200. Each channel 222 is curved and ends at an orifice 224. A plurality of channels 222 are fluidly coupled to, and end at, a single orifice 224. FIGS. 4 and 5 illustrate each orifice 224 being in fluid communication with two channels 222, and it is understood that each orifice 224 may be fluidly coupled to more than two channels 222. Channels 222 associated with an orifice 224 somewhat forms a U-shape or horseshoe shape, as explained in greater detail below.

In the example embodiment illustrated in FIGS. 4 and 5, channels 222 have the same length and have ends 222A (FIG. 5) which are at least roughly equally spaced from center C of disc member 220. It is understood that in other example embodiments, however, channels 222 are not the same length and do not have ends 222A which are equally spaced from center C. As shown in FIG. 5, orifices 224 are equally spaced from the center C of disc member 200. FIG. 5 also shows, in dashed lines, the location of the walls of valve seat 138 which define central passageway 138B. Ends 222A of channels 222 are disposed radially inwardly of central passageway 138B and orifices 224 are disposed radially outwardly along the disc member 200 relative to central passageway 138B. In this way, fluid passing through central passageway 138B of valve seat 138 enters channels 222 at or near ends 222A and travels within channels 222 until reaching orifices 224 whereupon the fluid passes through orifices 224 and exits fluid injector 10.

As explained above, each orifice 224 is in fluid communication with two or more channels 222. In the example embodiment of FIGS. 4 and 5, the channels 222 associated with each orifice 224 are offset relative to each other. Channels 222 being offset relative to each other at orifice 224 facilitate fluid passing through orifices 224, and thus exiting fluid injector 10, having a swirl flow pattern. Specifically, instead of channels 222 associated with a single orifice 224 being symmetrical or mirror images of each other at the orifice 224, such as would result if channels 222 form a horseshoe or U-shape with orifice 224 being at the end of channels 222, channels 222 are displaced or offset relative to each other at orifice 224.

Figure 6:
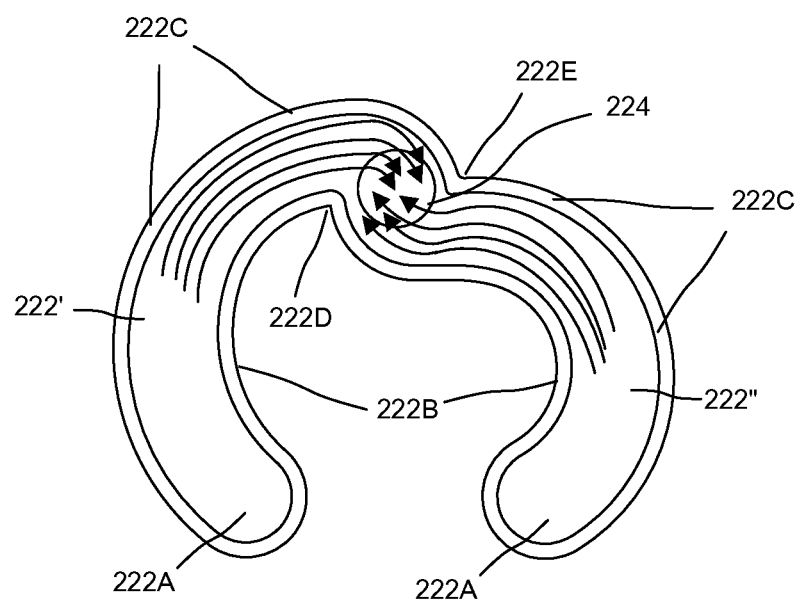
FIG. 6 is an enlarged view of channels appearing in the disc member of FIGS. 4 and 5.

FIG. 6 illustrates channels 222, referenced as 222' and 222", which are in fluid communication with an orifice 224 of disc member 200 of FIGS. 4 and 5, and particularly shows fluid flow paths in channels 222' and 222" towards orifice 224. With channels 222' and 222" being offset from each other at orifice 224, fluid flow from one channel 222' enters orifice 224 towards one portion thereof (the upper portion, from the perspective of FIG. 6) while fluid flow from the other channel 222" enters orifice 224 towards the other portion (the lower portion) thereof. Such fluid flow from channels 222' and 222" into orifice 224 results in fluid flow exiting orifice 224 having a swirl pattern in a clockwise direction, as viewed from the perspective of FIG. 6.

With continued reference to FIG. 6, channels 222' and 222" are collectively defined at least in part by elongated side walls 222B and 222C, each of which extends from end 222A of channel 222' to end 222A of channel 222". The offset positioning of channels 222' and 222" at orifice 224, as described above, results in a dimple formed at point 222E along an outside portion of elongated side wall 222C, and in a dimple formed at point 222D along an outside portion of elongated side wall 222B. Such dimples are disposed across orifice 224 from each other, along a line passing through a center of orifice 224.

The offset positioning of channels 222' and 222" which are fluidly coupled to the same orifice 224 can be described another way. Referring again to FIG. 6, elongated side walls 222B and 222C are curved such that tangent lines taken along each curved wall 222B, 222C smoothly transition at nearly all locations along side walls 222B and 222C. However, tangent lines along each side wall 222B and 222C undergoes an abrupt or discontinuous change at one location. The abrupt or discontinuous change in the tangent lines occurs at points 222D and 222E along curved elongated walls 222B and 222C, respectively, where the above-mentioned dimples are located.

Figure 7:
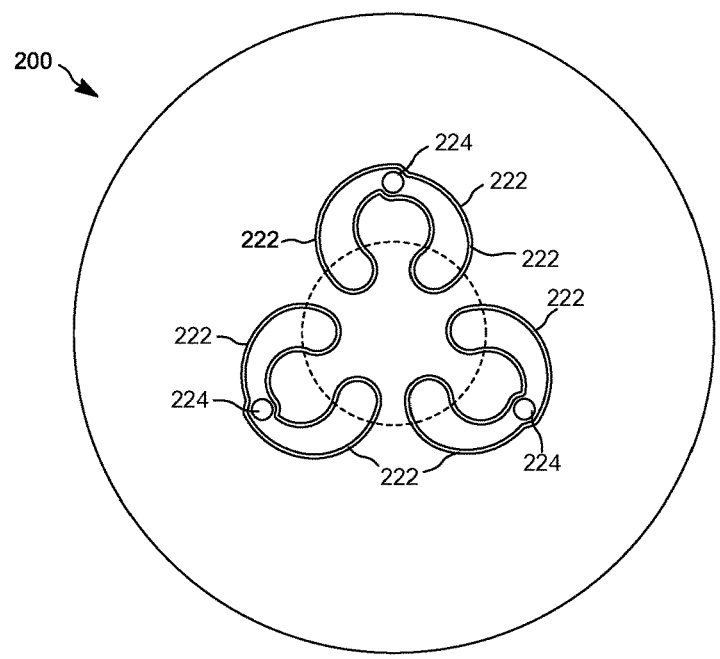
FIG. 7 is a top view of the disc member of the fluid injector of FIG. 1 according to another example embodiment.
Figure 8:
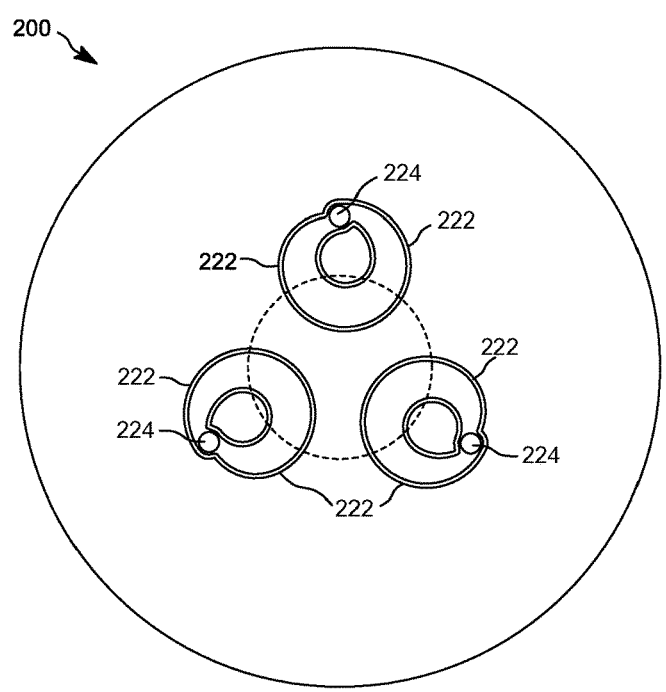
FIG. 8 is a top view of the disc member of the fluid injector of FIG. 1 according to yet another example embodiment.

FIGS. 7 and 8 depict disc member 200 according to additional example embodiments. In FIG. 7, channels 222 associated with an orifice 224 are offset each other, forming dimples as discussed above with respect to the embodiment of FIGS. 4-6, but here the amount of channel offset is not as pronounced. In FIG. 8, offset channels 222 are fluidly coupled to each other at orifice 224 and also at an opposite location therefrom, effectively forming a single channel.

Fluid injector 10, including disc member 200, may be a fuel injector for injecting fuel into the intake manifold or combustion chamber of an internal combustion engine. Alternatively, fluid injector 10 may be an injector for a reductant delivery unit of a selective catalytic reduction system in which a reductant is injected into the exhaust stream of a vehicle's exhaust line for reducing the vehicle's nitrogen oxide emissions. Further, it is understood that spray disc member 200 may be utilized in fluid and/or fuel injectors having other architectures and component arrangements than the architecture and component arrangement of fluid injector 10 illustrated in FIG. 1 and described hereinabove.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A fluid injector for injecting fluid, comprising:
   a body;
   a fluid passageway defined through the body and extending from an inlet to an outlet of the fluid injector;
   a valve seat disposed internally of the body within the fluid passageway;
   a valve element that is selectively reciprocated relative to the valve seat to close and open the fluid passageway by seating the valve element on and unseating the valve element from the valve seat, respectively; and
   a disc member disposed in the fluid passageway downstream of the valve seat relative to a direction of the flow of fluid through the fluid injector, the disc member comprising a plurality of channels defined along a first surface of the disc member and a plurality of orifices, with each orifice defined through the disc member and fluidly coupled to at least two of the channels,
   wherein the channels fluidly coupled to each orifice are in offset relation to each other at the orifice such that fluid flowing through and exiting each of the orifices from the channels forms a swirl pattern, and
   wherein the channels fluidly coupled to each orifice are in fluid communication with each other at a location other than at the orifice, each orifice is disposed along the disc member radially outwardly from an opening of the fluid passageway at a downstream portion of the valve seat, and for each orifice, each channel fluidly coupled thereto includes a first end opposite the orifice, the first ends of the channels of each orifice are fluidly coupled to each other such that the channels form a single channel and are disposed along the disc member radially inwardly of the opening of the fluid passageway at the downstream portion of the valve seat, and the orifices are not fluidly coupled to each other.

2. The fluid injector of claim 1, wherein the channels associated with each orifice are collectively defined at least in part by a first elongated side wall and a second elongated side wall, each of the first elongated side wall and the second elongated side wall includes a dimple at the orifice, the dimples being disposed across the orifice from each other.

3. The fluid injector of claim 1, wherein the channels associated with each orifice are collectively defined at least in part by a first elongated side wall and a second elongated side wall, and tangent lines along the first elongated side wall are discontinuous at the orifice and tangent lines along the second side channel wall are discontinuous at the orifice.

4. The fluid injector of claim 1, wherein for each channel, a channel width at the orifice is greater than a channel width at other locations of the channel.

5. The fluid injector of claim 1, wherein the channels fluidly coupled to each orifice are collectively defined at least in part by a first elongated side wall and a second elongated side well, each of the first and second elongated side walls including a dimple defined at the orifice.

6. The fluid injector of claim 1, wherein each orifice has a diameter that is less than a width of the corresponding channels.

7. A fluid injection device, comprising:
   a disc member for passing fluid therethrough, comprising a plurality of channels defined along a first surface of the disc member, and a plurality of orifices defined through the disc member, with each orifice being in fluid communication with a plurality of channels, the channels in fluid communication with each orifice being in offset relation to each other at the orifice such that fluid flowing through the orifice from the channels forms a swirl pattern, wherein each channel in fluid communication with an orifice includes a first end opposite the orifice and a second end at the orifice, the first ends of channels fluidly coupled to the same orifice are in fluid communication with each other such that the channels form a single, continuous channel for the orifice, and the orifices are not fluidly coupled to each other.

8. The fluid injection device of claim 7, further comprising:
   a body;
   a fluid passageway defined through the body and extending from an inlet to an outlet of the fluid injection device;
   a valve seat disposed internally of the body within the fluid passageway; and
   a valve needle that is axially movable within the body between a closed position in which the valve needle sealing engages with the valve seat so as to prevent fluid from flowing through fluid passageway and exiting the fluid injection device, and an open position in which the valve needle is spaced from the valve seat so as allow fluid to flow through the fluid passageway and exit the fluid injection device.

9. The fluid injection device of claim 8, wherein each orifice is disposed along the disc member radially outwardly of an opening of the valve seat at a downstream portion thereof, each channel includes the first end opposite the orifice to which the channel is in fluid communication, and each first end is disposed along the disc member radially inwardly to the opening of the valve seat at the downstream portion thereof.

10. The fluid injection device of claim 7, wherein the channels associated with each orifice are collectively defined at least in part by a first elongated side wall and a second elongated side wall, each of the first elongated side wall and the second elongated side wall including a dimple located at the orifice, and the dimple of the first elongated side wall is disposed across the orifice from the dimple of the second elongated side wall.

11. The fluid injection device of claim 7, wherein the channels associated with each orifice are collectively defined at least in part by a first elongated side wall and a second elongated side wall, and tangent lines along the first elongated side wall are discontinuous at the orifice and tangent lines along the second elongated side wall are discontinuous at the orifice.

12. The fluid injection device of claim 7, wherein for each channel, a channel width at the orifice is greater than a channel width at other locations along the channel.

13. The fluid injection device of claim 7, wherein each orifice has a diameter that is less than a width of the corresponding channels.

* * * * *